Feb. 20, 1962  O. BREIG  3,022,046
APPARATUS FOR COOLING GASEOUS SOLID SUSPENSIONS
Filed Nov. 4, 1952  2 Sheets-Sheet 1
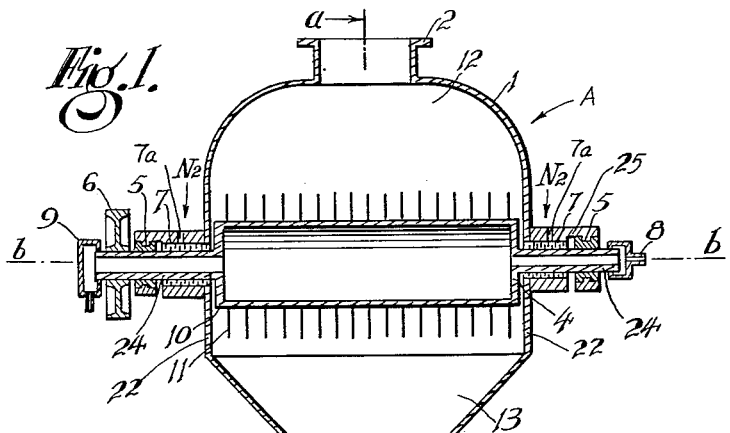
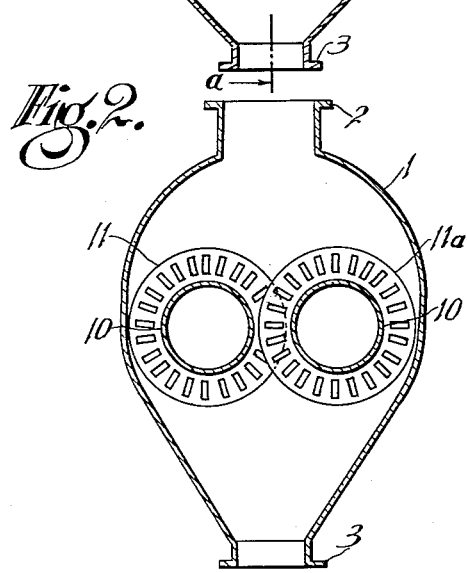
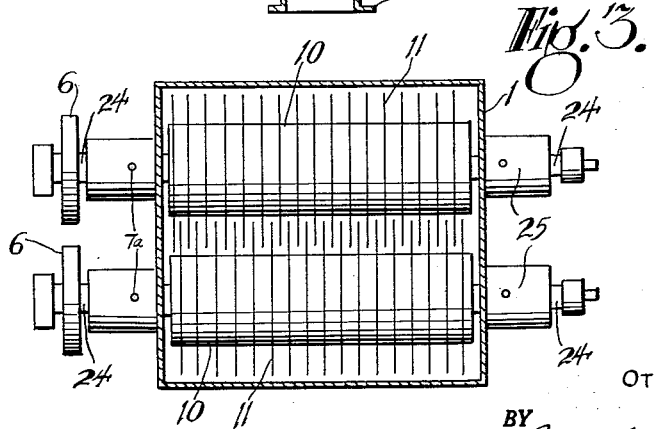
INVENTOR.
OTTO BREIG
BY Pollard and Johnston
ATTORNEYS Feb. 20, 1962     O. BREIG     3,022,046
APPARATUS FOR COOLING GASEOUS SOLID SUSPENSIONS
Filed Nov. 4, 1952     2 Sheets-Sheet 2
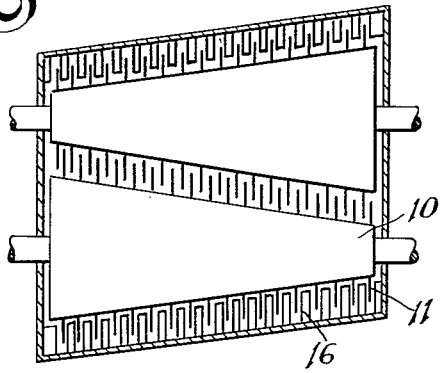
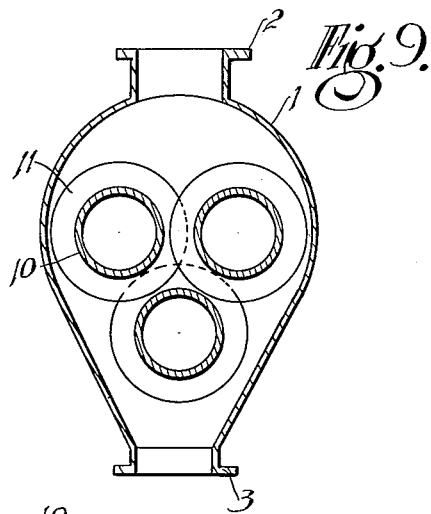
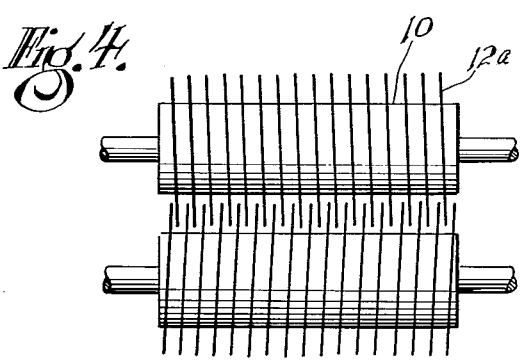
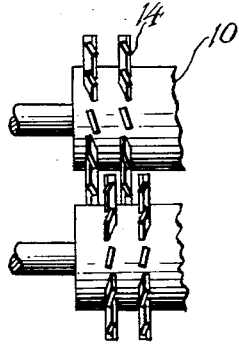
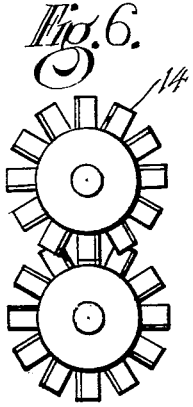
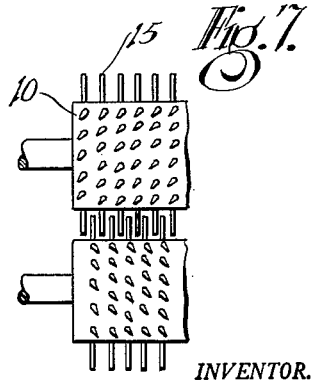
INVENTOR.
OTTO BREIG
BY Pollard and Johnston
ATTORNEYS

United States Patent Office 3,022,046
Patented Feb. 20, 1962

3,022,046
APPARATUS FOR COOLING GASEOUS
SOLID SUSPENSIONS
Otto Breig, Muttenz, Switzerland, assignor, by mesne assignments, to Fabriques de Produits Chimiques de Thann et de Mulhouse, Thann (Haut-Rhin), France, a corporation of France
Filed Nov. 4, 1952, Ser. No. 318,655
8 Claims. (Cl. 257—87)

The present invention relates to apparatus for cooling hot gaseous suspensions of finely divided solids and producing simultaneously at least a partial agglomeration of the fine solid particles suspended therein. More particularly, this invention relates to such apparatus which utilizes the principle of a rotary drum and is adapted for cooling hot gaseous suspensions of very fine solid metal oxides as they are produced by thermal reactions of volatile metals or metal compounds with oxygen containing gases. Among examples of such suspensions are the gaseous suspensions of finely divided zinc oxide obtained by burning metallic zinc vapor in air, and gaseous suspensions of titanium dioxide obtained by the thermal reaction of titanium tetrachloride vapor with oxygen.

It is known that the cooling of such gaseous suspensions and the precipitation and separation of the fine solid particles from the suspension gases involve great technical difficulties. The reactions which yield the suspensions generally take place at temperatures of the order of 1000° C. or more and thus produce very hot gases carrying large amounts of fine solids. These hot suspensions must be cooled before the suspended solids can be recovered, and in many cases the cooling must be effected very rapidly in order to avoid an undesirable growth of fine solid particles, which would decrease their usefulness as pigmentary materials.

The individual particles of the suspensions, which are sometimes called aerosols, have a very small grain size that depends upon the intended use of the separated product but generally is substantially below 1 micron. Suspended particles of such a small size separate very slowly from the reaction gases; so special provisions must be made for their separation. In order to separate them quickly, the individual solid particles must be united into larger agglomerates, preferably after having previously cooled the suspension containing them.

When this problem is dealt with by using known types of cooling apparatus, such as tubular coolers, etc., difficulties arise because part of the solid matter in the suspension deposits on the walls of the cooling apparatus, thereby acting as a heat insulator and finally completely clogging the apparatus. The cooling effect of the apparatus rapidly decreases as these deposits are formed; so frequent cleaning of the cooling surfaces is necessary. It has been attempted to overcome these difficulties by using knocking devices or moving scrapers to clean the cooling surfaces regularly, but such means are merely expedients which often do not satisfy the needs.

It is the principal object of this invention to provide new and improved apparatus by which gaseous solid suspensions of the type described can be cooled rapidly without disturbance, and which brings about a substantial agglomeration of the suspended solid or aerosol particles in the course of the cooling operation so that the particles can be quickly separated from the suspension gases.

Another object of this invention is to provide such a cooling apparatus which operates continuously with a high efficiency of heat transfer.

Basically, the apparatus of this invention comprises a stationary casing having an inlet opening at one end for receiving the hot gaseous suspension and an outlet opening at the opposite end for discharging the cooled suspension, the casing forming between these openings a chamber which contains a plurality of hollow rotary cooling drums having relatively fixed axes of rotation, each drum being provided with inlet and outlet conduits for circulating a cooling fluid therethrough, and each drum having mounted on its shell a series of spaced, radial cooling projections or fins which are so arranged that cooling projections of each drum gear or protrude into free spaces between such projections of an adjacent drum. For this purpose the axes of the drums preferably are parallel and the radial cooling projections of adjacent drums are displaced in axial direction relative to one another.

It is important that the casing chamber be constructed so as to impart to the gaseous suspension within the casing a flow substantially normal to the axes of rotation of the drums. This can be accomplished by making the casing walls lie adjacent to the end surfaces of the drums and to the cooling projections along proximate sides of the drums at locations where these walls intersect a plane passing through the axes of at least two of the drums. At the opposite sides of this plane, the casing walls extend away from the drums toward the respective inlet and outlet openings for the gaseous suspension, thus forming two compartments which communicate one with the other through free spaces between the radial projections of the adjacent drums. These compartments effect an even distribution of the suspension over the drums and an even flow thereof in a direction normal to their axes. In order to avoid accumulations of solids in the casing, the chamber which it forms should extend generally vertically with the suspension inlet compartment above the drums and the outlet compartment below.

The cooling drums may be of any suitable form, such as a cylinder, a simple or double frusto cone, or a vaulted barrel. The cooling apparatus may comprise more than two rotary drums, for example, there may be three drums having their axes on the same plane, or two drums having their axes on the same plane and a third drum having its axis parallel to the axes of said two drums but placed midway between and underneath these two. The apparatus may also comprise three drums having their axes all on one plane and two more drums positioned below these three drums, each disposed midway between two adjacent upper drums.

The radial cooling projections may have the form of ring discs extending either perpendicularly or obliquely to the axis of rotation of each drum. Projections of this form may be provided with radial slots. The radial projections, however, can also have the form of blades like those of turbines or fans, the rotation of which may induce a flow of the gaseous suspension through the casing.

It has been determined that the cooling effect, i.e. the heat transfer from the gaseous suspension to the cooling surfaces, depends primarily on the speed of rotation of the drums and on the velocity of the gases passing through the free spaces between adjacent drums and between the drums and the casing. The cooling effect is approximately proportional to the gas velocity and approximately proportional to the square root of the speed of rotation of the drums. The direction of rotation of the drums relative to each other apparently has a limited influence on the heat transfer, for it has been found that rotation of the drums in the same direction effects a heat transfer which is higher by several percents than the heat transfer effected by rotating the drums in opposite directions.

In order to obtain very high coefficients of heat transfer, the apparatus preferably is constructed so that the radial cooling projection or elements on the drums gear or extend into the free spaces between adjacent elements so as to mesh as closely as practicable. In this way an increased cooling effect is obtained, together with a high velocity of flow of the gaseous suspension. In order to increase the gas velocity still more, solid ribs may be mounted on the inner walls of the casing so as to project into the spaces between cooling projections of the drums proximate to these walls. With high gas velocities and high speeds of drum rotation, heat transfer coefficients exceeding 30 kcal./hr. m.$^2$ ° C., calculated on the total cooling surface of the drums, may be obtained.

Furthermore, it has been found that during the passage of the aerosols through the cooling apparatus, an advantageous agglomeration of very fine solid particles takes place. This agglomeration may be increased by rotating one of the drums faster than the other, for example, 5% to 25% faster, and by using radial cooling projections in the form of ring discs inclined slightly to the axes of the rotary drums. In this way, the spacing between the ring discs of adjacent drums varies locally and periodically between two limits. The agglomeration thus obtained is very desirable because it substantially facilitates the subsequent separation of the solid particles from the gases.

An illustration of this effect is as follows. A hot gaseous suspension of $TiO_2$ obtained by the decomposition of titanium tetrachloride with oxygen, having a content of about 500 gr. of $TiO_2/m.^3$ (NTP) and a temperature of 600° C., was conducted through a conventional tubular cooler and cooled therein to about 100° C. The suspension then was fed to a dust precipitator in the form of a cyclone which separated only about 40% of the $TiO_2$ contained in the gas. A hot gaseous suspension of the same composition and temperature then was cooled to about 100° C. in a rotary cooler according to the present invention and conducted from this cooler through the same cyclone. The degree of separation within the cyclone amounted in this case to substantially more than 90%. After having used the tubular cooler for only two hours, a $TiO_2$ deposit several centimeters thick was observed, and the heat transfer had diminished to less than half. The rotary cooler was operated for 14 hours, showing over the entire period the same high transfer of heat. It was then inspected and no deposite of $TiO_2$ could be observed on the ring discs of the drums or on the inside walls of the casing.

Other objects, features and advantages of the invention will become apparent from the following detailed description of illustrative embodiments and from the accompanying drawings in which:

FIG. 1 is a vertical section taken along the longitudinal axis of a rotary cooler embodying the invention;

FIG. 2 is a transverse vertical section taken along line A—A of FIG. 1;

FIG. 3 is a plan view of the cooling elements taken substantially along line B—B of FIG. 1, showing the casing in section;

FIG. 4 is a plan view of a second embodiment of the rotary drums;

FIG. 5 is a fragmentary plan view of a third embodiment of the rotary drums;

FIG. 6 is an end view of the rotary drums of FIG. 5;

FIG. 7 is a fragmentary plan view of a fourth embodiment of the rotary drums;

FIG. 8 is a plan view of a fifth embodiment of the invention, showing the casing in section; and FIG. 9 is a vertical section similar to FIG. 1, showing another arrangement of rotary drums.

Similar reference characters indicate corresponding parts in several figures of the drawing.

Referring now to FIGURES 1 to 3, a hot gaseous suspension previously formed by the thermal reaction of one or more volatile metals or metallic compounds and oxygen containing gases is introduced into a cooling chamber generally indicated at A wherein it is cooled and the suspended solid particles are partially agglomerated before it is passed to a separator for separating the solids from the gases.

The cooling chamber A is formed by a casing 1 having a top opening 2 for admitting the hot gaseous suspension into the chamber, cooling drums indicated at 10, and a bottom opening 3 for discharging the cooled suspension from the casing. The flow may be reversed with opening 3 acting as the inlet and opening 2 as the outlet, without changing the character of operation of the apparatus. The cooling drums 10 are hollow cylindrical drums which are mounted in the casing walls 22 for rotation about fixed parallel axes transverse to the path of flow of the suspension through the chamber. The drums 10 have axially extending hollow journals 24 at opposite ends thereof which rotatably support the drums in bearings 5. The bearings 5 are supported in fixed bearing housings 25. Since the gaseous suspension may contain noxious gases such as chlorine, labyrinth seals 7 are provided around the journals to prevent the escape of such gases through the bearing housings to the atmosphere. A rinsing gas such as nitrogen may be introduced into the seals 7 through radial bores 7a in the bearing housings. Each drum is driven by a pulley 6 fixed on one of its journals.

Cooling fluid is circulated through the hollow drums by supply and return conduits 8 and 9 which are connected respectively to opposite ends of the drum through passages in the journals.

Each drum carries a plurality of ring discs 11 provided with radial slots 11a which discs are spaced axially along and project radially from its outer surface. The discs of each drum are axially displaced relative to the discs on an adjacent drum and the axes of the drums are so spaced that the ring discs of each drum protrude into the free spaces formed between the ring discs of an adjacent drum. The clearance spaces between the interleaved ring discs is made as small as practicable in order to present a very large area of cooling surface and to increase the velocity of the gaseous suspension flowing through these spaces, thereby effecting high heat transfer.

At the level of the plane passing through the axes of the drums 10, the walls of the casing lie closely adjacent to the end surfaces of the drums and to the ring discs along proximate sides of the drums. From this location the walls extend vertically upward and downward away from the drums and converge toward the top and bottom openings 2 and 3 so as to form compartments 12 and 13 which communicate through the free spaces between the ring discs. By this construction the suspension admitted into the top compartment 12 is uniformly distributed over the drums and flows through the chamber A in a direction normal to the axes of the drums.

In FIGURE 4 the ring discs 12a are disposed at a slight oblique angle on the outer surfaces of the drums. The inclination should be kept small enough that the discs of adjacent drums will not contact each other during rotation. By rotating one of the drums faster than the other, the spacings or clearances between discs of adjacent drums vary periodically between two limits, and such periodic variation of the passages for the gaseous suspension increases the agglomeration of the solids in the suspension.

The drums of FIGURES 5 and 6 carry radially projecting cooling segments 14 which are arranged in axially spaced circumferential rows on the outer surface of each drum. The segments are positioned at an oblique angle to the drum axes, and the rows of segments on adjacent drums are displaced axially relative to each other so that the segments of such drums will not contact when they are rotated.

The projecting members of FIGURE 7 comprise series of turbine-like blades 15 arranged similarly to the segments 14 of FIGURES 5 and 6. These blades when rotated exert a considerable suction effect which induces flow of the gaseous suspension through the casing chamber.

In FIGURE 8 the drums are shown as hollow frustoconical members carrying ring discs 11 similar to those in FIGURE 3. In order to increase the velocity of the gaseous suspension, ribs 16 on inner surfaces of opposite walls of the casing extend inwardly into the spaces between ring discs on sides of the drums proximate to these walls so as to diminish the size of the passage between compartments 12 and 13 (see FIG. 1).

FIGURE 9 shows another arrangement of drums within the casing chamber. Three drums 10 are provided which are rotatable about spaced parallel axes. At least two of these drums divide the casing into compartments in a manner similar to the construction described in reference to FIG. 1.

It will be understood that the foregoing detailed description and the accompanying drawings are intended to exemplify the invention and that the new parts, improvements and combinations herein disclosed may be embodied in various other forms and arrangements of apparatus without departing from the substance of the disclosure or the intended scope of the appended claims.

What is claimed is:

1. An apparatus for conditioning a hot gaseous suspension of solid particles predominantly of sub-micron particle size for separation of the solids from the carrying gas, comprising a stationary casing having an inlet for the suspension at one end thereof and an outlet at a remote location, said casing forming an enlarged sealed passageway for conducting the suspension from said inlet to said outlet, and means traversing an intermediate portion of said passageway for constricting the flow of the suspension therethrough and continuously buffeting and cooling the constricted flow so as to agglomerate solid particles therein, said means including a plurality of hollow rotary drums extending across said passageway one adjacent to another on relatively fixed axes, means for conducting a cooling fluid through each drum, a multiplicity of cooling elements fixed to and projecting radially from each drum, said projecting elements of each drum being arranged circumferentially thereon and spaced apart therealong in the direction of the drum axis and extending into spaces between said projecting elements of an adjacent drum in closely spaced relation to the latter, said flow of the suspension being constricted predominantly to the free spaces between said elements, and means for rotating said drums about said axes to move said projecting elements relative to said constricted flow at a velocity which exceeds the velocity of the latter and is sufficient to intensively buffet and cool said constricted flow, to cause agglomeration of solid particles therein, and to prevent deposits of said particles from forming on said elements.

2. An apparatus as described in claim 1, said casing being disposed vertically and having said inlet at its upper end and said outlet at the bottom to avoid accumulations of solids in the casing.

3. An apparatus as described in claim 1, said means for rotating said drums being operative to rotate each drum in the same direction as the adjacent drum.

4. An apparatus as described in claim 1, said means for rotating said drums including means operative to rotate one of said drums at a speed substantially greater than the speed of the adjacent drum.

5. An apparatus for conditioning a hot gaseous suspension of solid particles predominantly of sub-micron particle size for separation of the solids from the carrying gas, comprising a stationary casing having an inlet for the suspension at one end thereof and an outlet at a remote location, said casing forming an enlarged sealed passageway for conducting the suspension from said inlet to said outlet, and means traversing an intermediate portion of said passageway for constricting the flow of the suspension therethrough and continuously buffeting and cooling the constricted flow so as to agglomerate solid particles therein, said means including a plurality of hollow rotary drums extending across said passageway one adjacent to another on relatively fixed axes, means for conducting a cooling fluid through each drum, a multiplicity of annular discs extending around and projecting radially from each drum, said discs of each drum being spaced apart in the direction of the drum axis and extending into spaces between the discs of an adjacent drum in closely spaced relation to the latter, said flow of the suspension being constricted predominantly to the free spaces between said discs, and means for rotating said drums about said axes to move said discs relative to said constricted flow at a velocity which exceeds the velocity of the latter and is sufficient to intensively buffet and cool said constricted flow, to cause agglomeration of solid particles therein, and to prevent deposits of said particles from forming on said discs.

6. An apparatus as described in claim 5, said discs of at least one of said drums extending obliquely to the axis of rotation of the drum so that the spacings between the discs of adjacent drums are continually varied during the rotation of said drums to enhnace the buffeting of said suspension.

7. An apparatus as described in claim 5, each of said projecting discs being provided with a multiplicity of radial slots therein to enhance the buffeting of said suspension.

8. An apparatus for conditioning a hot gaseous suspension of solid particles predominantly of sub-micron particle size for separation of the solids from the carrying gas, comprising a stationary casing having an inlet for the suspension at one end thereof and an outlet at a remote location, said casing forming an enlarged sealed passageway for conducting the suspension from said inlet to said outlet, and means traversing an intermediate portion of said passageway for constricting the flow of the suspension therethrough and continuously buffeting and cooling the constricted flow so as to agglomerate solid particles therein, said means including a plurality of hollow rotary drums extending across said passageway one adjacent to another on relatively fixed axes, means for conducting a cooling fluid through each drum, a multiplicity of cooling blades fixed to and projecting radially from each drum, said projecting blades of each drum being sloped obliquely to the axis of the drum and arranged thereon in circumferential groups spaced apart in the direction of said axis, said groups of blades of each drum extending into spaces between and moving in closely spaced relation to the groups of blades of an adjacent drum, said flow of the suspension being constricted predominantly to the free spaces between said blades, and means for rotating said drums about said axes to move said blades relative to said constricted flow at a velocity which exceeds the velocity of the latter and is sufficient to intensively buffet and cool said constricted flow, to cause agglomeration of solid particles therein, and to prevent deposits of said particles from forming on said blades.

References Cited in the file of this patent

UNITED STATES PATENTS

| | | |
|---|---|---|
| 1,367,881 | Lea | Feb. 8, 1921 |
| 1,380,460 | Bancel | June 7, 1921 |
| 1,717,237 | Mager | June 11, 1929 |
| 1,980,791 | Duggan et al. | Nov. 13, 1934 |
| 1,990,541 | Fugle | Feb. 12, 1935 |
| 2,007,838 | Scott et al. | July 9, 1935 |
| 2,021,117 | Lucke | Nov. 12, 1935 |
| 2,056,023 | Stevenson | Sept. 29, 1936 |
| 2,311,984 | Guild | Feb. 23, 1943 |

FOREIGN PATENTS

| | | |
|---|---|---|
| 340,765 | Great Britain | Dec. 19, 1929 |
| 438,007 | Germany | Dec. 2, 1926 |